(12) United States Patent
Van Wiemeersch (10) Patent No.: US 8,890,654 B2
(45) Date of Patent: Nov. 18, 2014

(54) METHODOLOGY FOR EMERGENCY TRANSFER OF KEYS FOR VEHICLE EQUIPPED WITH BIOMETRIC ACCESS AND START

(71) Applicant: Ford Global Technologies, LLC, Dearborn, MI (US)

(72) Inventor: John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 13/775,553

(22) Filed: Feb. 25, 2013

(65) Prior Publication Data

US 2014/0240086 A1  Aug. 28, 2014

(51) Int. Cl.
*G05B 19/00* (2006.01)
*G05B 1/00* (2006.01)

(52) U.S. Cl.
CPC .......................................... *G05B 1/00* (2013.01)
USPC .............. 340/5.8; 340/5.2; 340/5.1; 340/5.72

(58) Field of Classification Search
CPC combination set(s) only.
See application file for complete search history.

(56) References Cited

U.S. PATENT DOCUMENTS

| | | | |
|---|---|---|---|
| 5,969,597 A | 10/1999 | Weigl et al. | |
| 6,075,454 A | 6/2000 | Yamasaki | |
| 6,897,767 B2 * | 5/2005 | Kim | 340/426.35 |
| 7,277,007 B2 | 10/2007 | John et al. | |
| 7,425,886 B2 | 9/2008 | Yoshii et al. | |
| 7,602,274 B2 | 10/2009 | Lee et al. | |
| 7,679,490 B2 | 3/2010 | Hammes | |
| 8,085,139 B2 | 12/2011 | Kanevsky et al. | |
| 8,487,743 B2 * | 7/2013 | Proefke et al. | 340/5.72 |
| 2004/0252012 A1 * | 12/2004 | Beenau et al. | 340/5.4 |
| 2006/0220806 A1 | 10/2006 | Nguyen | |
| 2006/0253711 A1 | 11/2006 | Kallmann | |
| 2007/0279184 A1 | 12/2007 | Desai et al. | |
| 2010/0039215 A1 * | 2/2010 | Proefke et al. | 340/5.1 |
| 2012/0253607 A1 | 10/2012 | Choi | |

* cited by examiner

*Primary Examiner* — Travis Hunnings
(74) *Attorney, Agent, or Firm* — Frank A. MacKenzie; Brooks Kushman P.C.

(57) ABSTRACT

A system may include a system controller in communication with a function controller and configured to receive an authentication request. The authentication request may include a user input and the user input may be authenticated by matching the user input with at least one stored input. The controller may determine a vehicle mode and update, via the function controller, a status associated with a key fob in response to the vehicle mode being in an authenticated mode.

20 Claims, 7 Drawing Sheets

METHODOLOGY FOR EMERGENCY TRANSFER OF KEYS FOR VEHICLE EQUIPPED WITH BIOMETRIC ACCESS AND START

BACKGROUND

Automotive vehicles may have several keys associated with the vehicle that allow access to be granted to the vehicle. Moreover, biometrics may be used to authenticate a driver. A combination of at least two valid keys must be present to program another key. Alternatively, two valid biometric inputs may be used, or one valid key and one valid biometric input, to program an additional key. As such, at any given time, the driver of a vehicle may have only physical keys, only enrolled biometric inputs or some combination of both. In the case of only having enrolled biometric inputs, it may not be possible to transfer drive rights to the vehicle if the user with sole biometric access has departed the vicinity of the vehicle or is incapacitated. For this reason, conventional systems fail to permit easy transfer of an active key or programming of an additional key, especially when only one other valid key is present. Thus, an improved system for programming additional keys, as well as transferring existing keys while the maintaining security of the vehicle is needed.

SUMMARY

In one embodiment a system may include a system controller in communication with a function controller and configured to receive an authentication request. The authentication request may include a user input and the user input may be authenticated by matching the user input with, at least, one stored input. The controller may determine a vehicle mode and update, via the function controller, a status associated with a key fob in response to the vehicle mode being in an authenticated mode.

A method may include receiving an access request including a user input. The user input may be compared with, at least, one stored input and authenticated in response to the user input matching the at least one stored input. A vehicle mode may be determined and a status associated with a key fob in may be updated in response to the vehicle mode being an authenticated mode.

A method may also include detecting a key fob within a receptacle. A first and second input may be authenticated. A status associated with the key fob may be updated to include a backup status in response to the authentication of the first and second inputs.

BRIEF DESCRIPTION

DETAILED DESCRIPTION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

In certain situations, a driver of a vehicle may wish to transfer a key fob to another driver for gaining access and drive privileges to the vehicle (e.g., valet drivers, dealer service personnel, friends and family, etc). Some of these situations may include emergency situations such as allowing police access to move the vehicle after an accident, transferring the key fob in the event of a medical emergency, as well as transferring the key fob under duress such as a carjacking or robbery. Thus, programming a back-up or emergency transfer key fob to be kept inside a vehicle may allow a driver, under prescribed conditions, to activate the emergency transfer key and then easily transfer the key fob to allow access and drive privileges to the vehicle. Under the right circumstances, e.g., appropriate authentication and state of the vehicle, the emergency transfer key fob may be handed to another driver within a few seconds. An emergency transfer system of a vehicle may include a receptacle and a biometric device configured to grant access to the receptacle. The receptacle may be configured to house an emergency transfer key fob. Upon authentication of the user, the key fob may be removed from the receptacle and transferred to a second user. Thus, although a second user may not be a registered user, the second user may use the vehicle in ordinary course. Prior to removal of the key fob from the receptacle, the system may determine whether the key fob was removed during one of an authenticated or non-authenticated modes. Based on this determination, the status of the key fob may be updated, thus affecting the functionality of the key.

Figure 1:
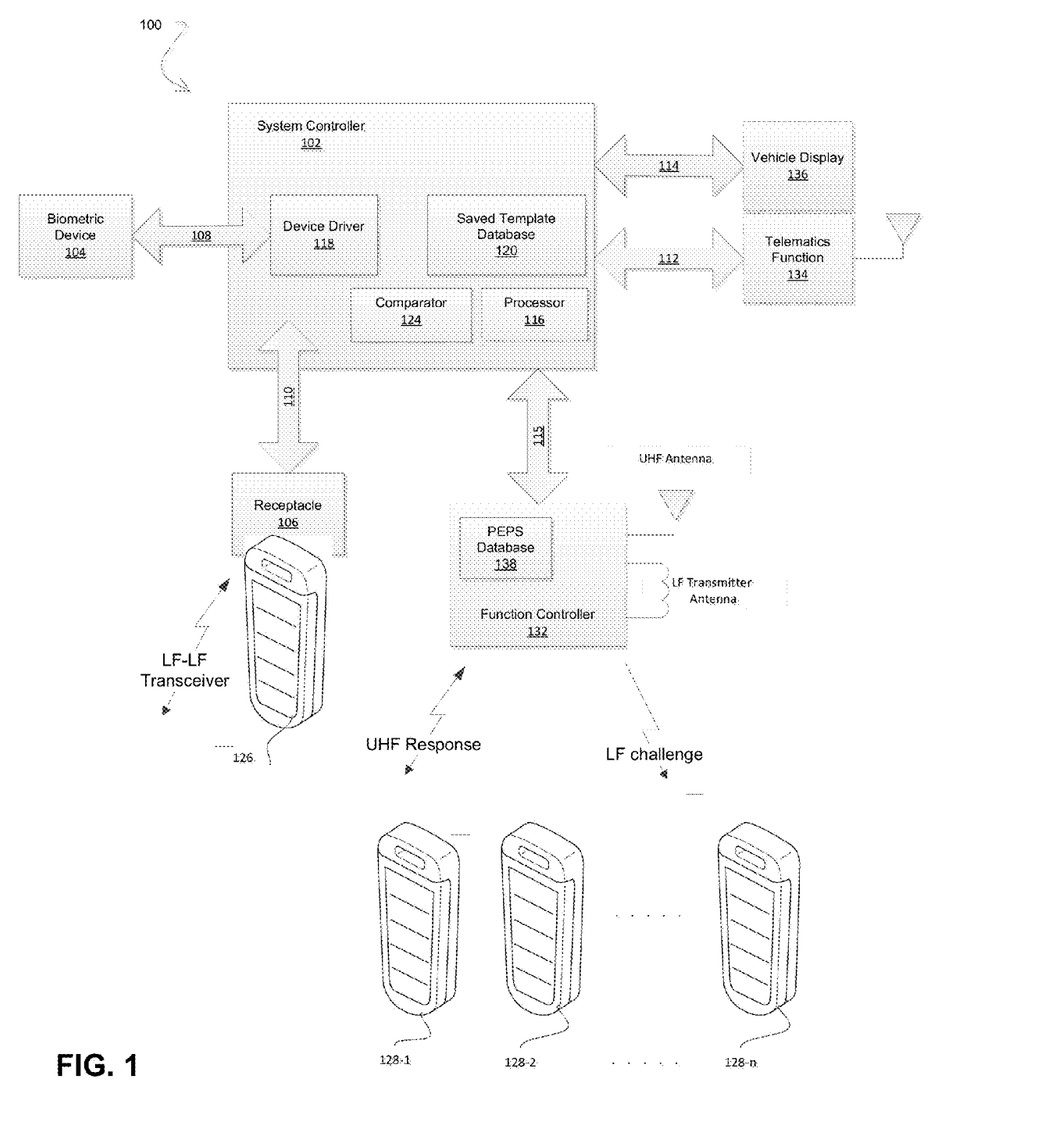
FIG. 1 is an exemplary system diagram of the emergency transfer system.

FIG. 1 shows an exemplary system for the emergency transfer system. The system 100 may include a controller 102 in communication with a biometric device 104 and a receptacle 106. The biometric device 104 may be configured to collect biometric inputs from a user. In one example, the device 104 may be a fingerprint scanner configured to read at least one fingerprint or thumbprint of the user (hereafter referred to as fingerprint). In another example, the device 104 may be a voice recorder or retina scanner. For exemplary purposes only, the biometric device 104 is discussed herein as a fingerprint scanner. The biometric device 104 may be included within the vehicle. In one example, the biometric device 104 may be integrated with a push-button starter. In another example the biometric device 104 may be integrated within the top of a gear stick of the vehicle, or within the dashboard. In yet another configuration, the biometric device 104 may be located in close proximity or within the receptacle 106.

The biometric device 104 may communicate with the controller 102 via a first interface 108. The interfaces described herein, including the first interface 108, second interface 110, third interface 112, fourth interface 114, and fifth interface 115, may include an input/output system configured to transmit and receive data from the respective components. For example, the first interface 108 may facilitate the transfer of biometric data from the biometric device 104 to the controller 102. Moreover, the interfaces 108, 110, 112, 114, and 115 may be one-directional such that data may only be transmitted in one-direction. For example, the first interface 108 may only be configured to transmit biometric data to the controller 102, but not vice versa. Additionally, the interfaces 108, 110, 112, 114, and 115 may be bi-directional, both receiving and transmitting data between the components. In one example, the first interface 108 may be one-directional while the remaining interfaces 110, 112, 114, and 115 may be bi-directions.

The interfaces 108, 110, 112, 114, and 115 may include security features and thus be considered a trusted path. In one approach, for example, the interfaces may include a Trusted Execution Technology (TXT), which may allow for secure key generation, storage and authentication. By securing the paths, the interfaces 108, 110, 112, 114, and 115 provide for an enhanced system to protect against the transmission data (e.g., copied biometric data), which could lead to false identification. Other security mechanisms may also be implemented. In one example, timestamps may be generated with the biometric data. Thus, when the controller 102 receives the data, the timestamp may be verified to assure that the input is a true biometric sample and not one that was copied.

The controller 102 may include a processor 116 configured to facilitate authentication processes as described herein. The controller 102 may also include a device driver 118 to control communication between the biometric device 104 and the controller 102. The device driver 118 may facilitate receiving biometric data at the controller 102. It may convert or translate the biometric data into a usable biometric template. These templates may be used to authenticate a user based on the received biometric data. In the example of the biometric data being a fingerprint, the data may need to be converted to a readable format, such as a template, before the authentication process may be performed. For example, each fingerprint includes unique data points, e.g., an arch in the center, a double loop, etc. These minutia may be translated into a numeric pattern, e.g., a vector, which makes up the biometric template. Because the biometric template is a numerical representation of the fingerprint data, an image of the fingerprint itself is never stored within the controller 102. This template may be represented and transmitted in a standard format such as Biometric Interworking Protocol (BIP). A Biometric Identification Record (BIR) may include a header, biometric data and a signature, which may be recognized by the controller 102.

Biometric data may be received at the controller 102 in several situations. Initially, data may be received for enrollment purposes. A user may enroll his or her biometric data (e.g., fingerprint) during an enrollment mode. In this situation, two or more key fobs previously programmed to the vehicle (typically at the factory) or two or more previously stored prints may be required to be present (i.e., key fob and/or person to whom prints belong) to assure that the user attempting to enroll his or her biometric data is authorized to do so. Additionally or alternatively a personal identification number (PIN) may be entered via a separate interface and analyzed by the controller 102 to further authenticate the user prior to biometric enrollment. Upon authenticating the user, the received biometric data may be converted to a biometric template, as described above. The enrolled biometric template is then saved in template database 120. The enrolled template may be saved in the database 120 and used at a later time to authenticate the user. Although any number of biometric templates may be stored in the database 120, a typical system may allow up to twelve templates to be stored.

As mentioned, biometric data may also be received in an authentication mode to authenticate the user. The biometric data may be received in an effort to gain access to the vehicle. When biometric data is received for authentication purposes, the data may be converted to a received biometric template at the controller 102. A comparator 124 within the controller 102 may then compare the received template with the enrolled templates within the template database 120. Upon locating a match of the received template with at least one of the enrolled templates, the comparator 124 may communicate a 'pass' indicator to the controller 102. If a match is not returned, a 'fail' indicator may be returned.

Upon receiving a positive match indication from the comparator 124, access and drive rights to the vehicle may be granted. Such access may include unlocking the door or doors to a vehicle in order to allow the user to enter the vehicle. Access may also include other functionality such as regular operation of the vehicle (e.g., starting the vehicle, driving, operating the radio, lights, etc.). As described in more detail below, upon biometric authentication, an emergency transfer key fob 126 may also be activated. In a normal state within the receptacle 106, the emergency transfer key fob 126 may be designated as INACTIVE. Thus, for anti-theft security reasons, if the key fob is removed while the vehicle is off, or in park, the key fob may not be used to access or drive the vehicle. This process is described in more detail below with respect to FIG. 3.

The key fobs 126, 128 described herein may have passive entry/passive start (PEPS) capabilities. The key fobs 126, 128 may also be part of systems known as Keyless Access System, Advance Key, Comfort Access, Enter-N-G™, Intelligent Access, Smart Entry, SmartKeys, Intelligent Key®, SmartPass, Kessy, to name a few. The key fobs 126, 128 may communicate with the vehicle via LF and/or UHF frequency communication protocols, including challenges and responses, between the key fob 126, 128 and a function controller 132. The function controller 132 may be a PEPS controller and may be in communication with the system controller 102. The function controller 132 may also be integrated within the system controller 102. The function controller 132 may include or be in communication with a PEPS database 138. The PEPS database 138 may include a listing of the registered key fobs 126, 128 and a status associated therewith. For example, key fob 128-1 may be a primary key fob, while 128-2 may be a secondary key fob. These associated status indicators may relate to certain vehicle settings associated with the normal user of that key fob 128, such as seat position, temperature control, etc.

The PEPS capabilities may provide several keyless functions to a user including passive entry, passive engine start, engine shut off, passive lock, etc. In one example, a key fob 128 may be associated with a user (e.g., in the user's pocket or purse). The function controller 132 and the key fob 128 may communicate with each other. The function controller 132, upon authenticating the key fob 128, may then unlock a vehicle door. The key fob 128 may include a transponder configured to operate as a radio-frequency identification (RFID) tag paired to the function controller 132. In order to gain access to the vehicle via unlocking the doors, controller 102 may wake up in order to establish a communication between the key fob 128 and the function controller 132. For example, the user may touch or toggle a handle of a door of the vehicle or push the start button which is recognized by controller 102. Once the system controller 102 has woken up and, in turn, wakes up the function controller 132, the controller 132 may transmit a low frequency signal to the key fob 128. The key fob 128 may then respond with a high frequency signal, including a key fob ID. Upon receiving an authorized key fob ID from the key fob, the function controller 132 may send a signal to the system controller 102 via the fifth interface 115 indicating that the key fob is authorized. The system controller 102 may then send the appropriate signals to unlock the door. Thus, the key fob 128, the function controller 132, and system controller 102 all "handshake" before the function request is executed.

As shown in FIG. 1, several key fobs 128 may be recognized by the function controller 132. Each key fob 128 may include a specific key fob ID, as well as a vehicle identification number (VIN) associated with the vehicle. These IDs may be established by the manufacturer during production of the vehicle. Thus, an unrecognized key fob may not be used to gain access to the vehicle. Further, in the event that a key fob is lost or stolen, the key fob could not be re-programmed for use with another vehicle except by an authorized dealer of the automotive original equipment manufacturer (OEM). Moreover, if the key fob is wiped clean, e.g., one or more of the IDs are removed, re-programming the key fob would require a dealer test tool to do so. By this additional security measure, a stolen key is nearly worthless.

In some situations an unrecognized key fob may be programmed with the function controller 132. For example, if one or more of the original key fobs 128 are within a predetermined range of the controller 132 or inserted in receptacle 106, the vehicle system 100 can therefore verify that the key fob is authorized. Each of these key fobs may be associated with a certain status, such as a primary or secondary driver, stored within the database 138 of the function controller 132. Additionally, a key fob may be defined as an emergency transfer key fob 126. As explained herein, this key fob 126 may be stored within the receptacle 106 of a vehicle. Upon authenticating the user during a valid vehicle mode, the emergency transfer key fob 126 may be defined as ACTIVE within the function controller 132. A vehicle may operate in several modes. For example, a vehicle may operate in one of an authenticated mode and a non-authenticated mode. An authenticated mode may include vehicle operation wherein a user is required to gain access to the vehicle via some form of authentication. For example, driving the car would require a user to be authenticated by using a key, a biometric input, a signal from a recognized key fob, etc. These modes include accessory, motive, and may include delayed accessory modes. When the vehicle is an accessory mode, some functions which require relatively low power draw, or have a time-restriction for operation, are functional. In the motive mode, the car motor may be running and thus almost all functions are functional. In the delayed accessory mode, the car may have just left the motive state. In this mode, even when a car engine has been turned off, some functionality, which may include a vehicle radio, may still be available. In the non-motive off mode, the car is off except for the special condition of a remote start event (which is non-motive mode with very limited feature availability).

A non-authenticated mode may include instances or occurrences when a vehicle has not been accessed via authentication. For example, a car may be parked and thus in a non-motive mode. In another example, the vehicle may have been started via a passive start/remote start feature. Thus, the user may not be in or around the car, but the car may be idling in a non-motive mode. These modes may be considered non-motive off and non-motive run modes, respectively. In one embodiment, when the emergency transfer key fob 126 is removed from the receptacle 106 while the vehicle is in a non-motive, or non-authenticated state, the key fob 126 may remain INACTIVE. However, if the key is removed from the receptacle 106 during the accessory, motive or delayed accessory mode, the key fob may be updated to ACTIVE.

In another example, the emergency transfer key fob 126 may be removed from the receptacle while the vehicle is running (e.g., in a RUN mode). The key fob 126, because the device was authenticated, may be re-defined to be an active key fob (e.g., the status of the key fob may be updated to ACTIVE within the database 120), thus having all of the access and functionality afforded to it as do other active keys. By activating the emergency transfer key fob 126 as an active key, the key fob 126 may be transferred to any other user and that user may have full access and drive rights to the vehicle. On the other hand, if the key fob is removed from receptacle 106 during a non-RUN mode, (e.g., the vehicle was off), then the key fob 126 may continue to be defined as INACTIVE. Some capabilities may still exist for an inactive key, such as the panic and lock functions. This allows a user to know that the key fob is functional, but not in an active mode.

Thus, in certain emergency situations, the emergency transfer key fob 126 may be transferred to another user. For example, in a situation in which the driver of a vehicle has suffered from a health crisis while driving, such as a heart attack, stroke, etc., and emergency personal has removed the person from the vicinity of the vehicle, the key fob 126 within the receptacle 106 may be removed and used by a second user such as the passenger or another driver. The second user may then operate the vehicle and drive the initial driver to the hospital, follow the ambulance, move the vehicle to a safer location, etc. In another example, a driver may wish to valet their vehicle without giving the valet personnel their key fob. Upon arriving at the valet location, the driver may put their car in park and extract the emergency transfer key fob 126 from the receptacle 106. Because the vehicle was running at the time the key fob was withdrawn, the emergency transfer key fob 126 may be defined as ACTIVE by the function controller 132. Thus, the driver may transfer the emergency transfer key fob 126 to the valet personnel, giving the person full access to the vehicle.

Upon returning an emergency transfer key fob 126 back to the receptacle 106 after use, the key fob 126 may then be designated as INACTIVE again. Additionally or alternatively, the function controller 132 may be configured to re-designate a key fob 126 to INACTIVE after a predetermined amount of time or a predetermine action within the vehicle. For example, the emergency transfer key fob 126 may be designated as INACTIVE if it has not been returned to the receptacle 106 within four hours of its designation as ACTIVE. Thus, if a valet driver neglects to return the key fob, the key fob is not a security liability as it cannot be used to gain access to the vehicle. Details on this process are described below.

It may be beneficial for the key fob to maintain an INACTIVE status while in a non-motive mode. This may prevent against use of the key fob in the event the key fob is removed by an unauthorized user (e.g., thief).

The status associated with a specific key, (e.g., ACTIVE, INACTIVE, primary, secondary, emergency transfer/backup), may be maintained in a database 138 within or in communication with the function controller 132. This database 138 may maintain a list of the key fobs and each of their respective statuses. For example, key fob 128-1 may be a primary key fob while key fob 128-2 may be a secondary one. Additionally, a key fob 126 located within the receptacle 106 may be dedicated as an emergency transfer key fob 126 or back-up key fob. The database 138 may maintain these statuses. When the status of a key fob changes (e.g., from INACTIVE to ACTIVE), the database 138 may indicate this change and change a status indicator associated with the key fob ID within the database. The function controller 132 may communicate with the system controller 102 to grant access to active keys. Further, multiple statuses may be associated with a single key fob. For example, a key fob may be designated as an ACTIVE backup key fob.

The system may also include a telematics function 134 which may communicate with the system controller 102 via the third interface 112. The telematics function 134 may facilitate integration of certain telecommunication functions within the system. For example, a navigation system within the vehicle may be included in the telematics function 134. Moreover, the telematics function 134 may facilitate communication between the system controller 102 and a mobile device associated with the vehicle. Other functions included in the telematics function 134 may be global positioning systems (GPS), hand-free calling via a mobile device, safety warnings and alerts, driving assistance systems, vehicle tracking, etc.

A vehicle display 136 may be in communication with the system controller 102 via the fourth interface 114. The vehicle display 136 may be a display device configured to present information and options to the user within the vehicle. An exemplary configuration may also include input mechanisms, such as a touch screen, key pad, dials, knobs, etc. The display 136 may present warnings, information, control options, and the like to the user. In one example, the vehicle display 136 may be used to facilitate adding authorized user fingerprints and/or programming of key fobs, including daily use key fobs and emergency transfer key fobs 126. Exemplary displays 136 may include the MyFord Touch, and MyLincoln Touch.

Figure 2:
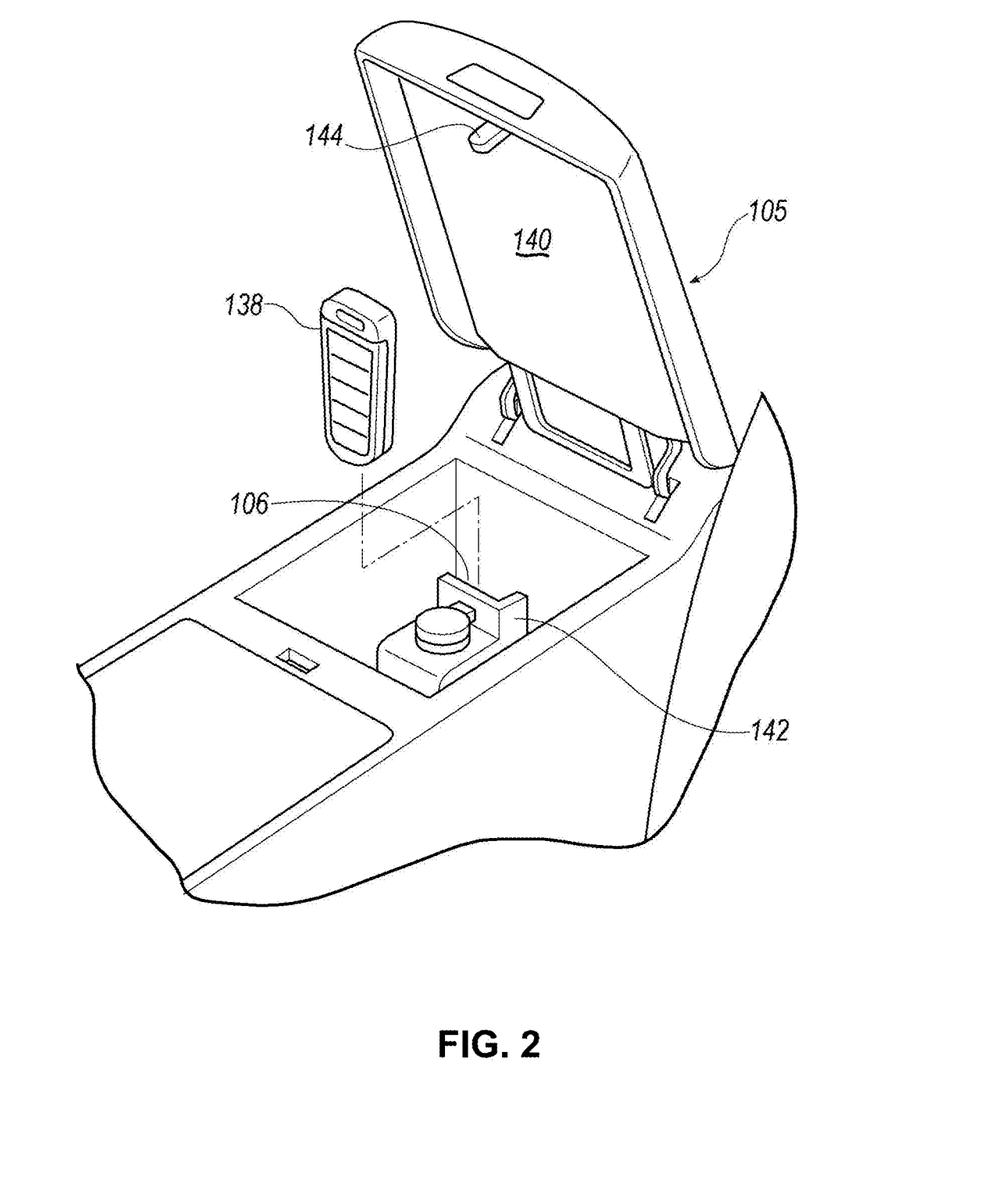
FIG. 2 is an exemplary receptacle and key fob.

FIG. 2 shows an exemplary receptacle mounting system 105 having a receptacle lid 140 and within a vehicle. The receptacle mounting system 105 may include a key fob retention wall 142 configured to receive and hold an emergency transfer key fob 126 in the back-up receptacle 106. The lid 140 may include a latch 144. The latch 144 may be configured to maintain the lid 140 in a closed position. Additionally, the latch 144 may be in communication with the biometric device 104, or another biometric device 104 configured to read biometric inputs and may be locked until authenticated biometric input is received.

The receptacle 106 may facilitate communication between the function controller 132 and a key fob having a low battery. As described above, the key fob and function controller 132 may communicate with each other via radio frequencies. When the battery of a key fob 126,128 is low, its ability to transmit signals may be hindered. Thus, by placing the key fob 126,128 within the receptacle, the key fob 126,128 may be close in proximity to the LF-LF transceiver coils of controller 132. Because the key fob 126,128 is now closer to the LF-LF transceiver coils of controller 128, a low frequency signal may be used by the key fob 126,128 in communication with the controller. When such low frequencies are used, the controller 132 may determine that a key fob is located within the receptacle.

Although not shown, a key detector such as a switch may be present within the retention wall 142. This detector may indicate to the function controller 132 or the system controller 102 that a key is present within the receptacle. Additionally an indicator LED may be present within the receptacle. The indicator may indicate to a user the status of the key fob 126. For example, the indicator may be green when the key fob 126 is ACTIVE and red when INACTIVE.

Figure 3A:
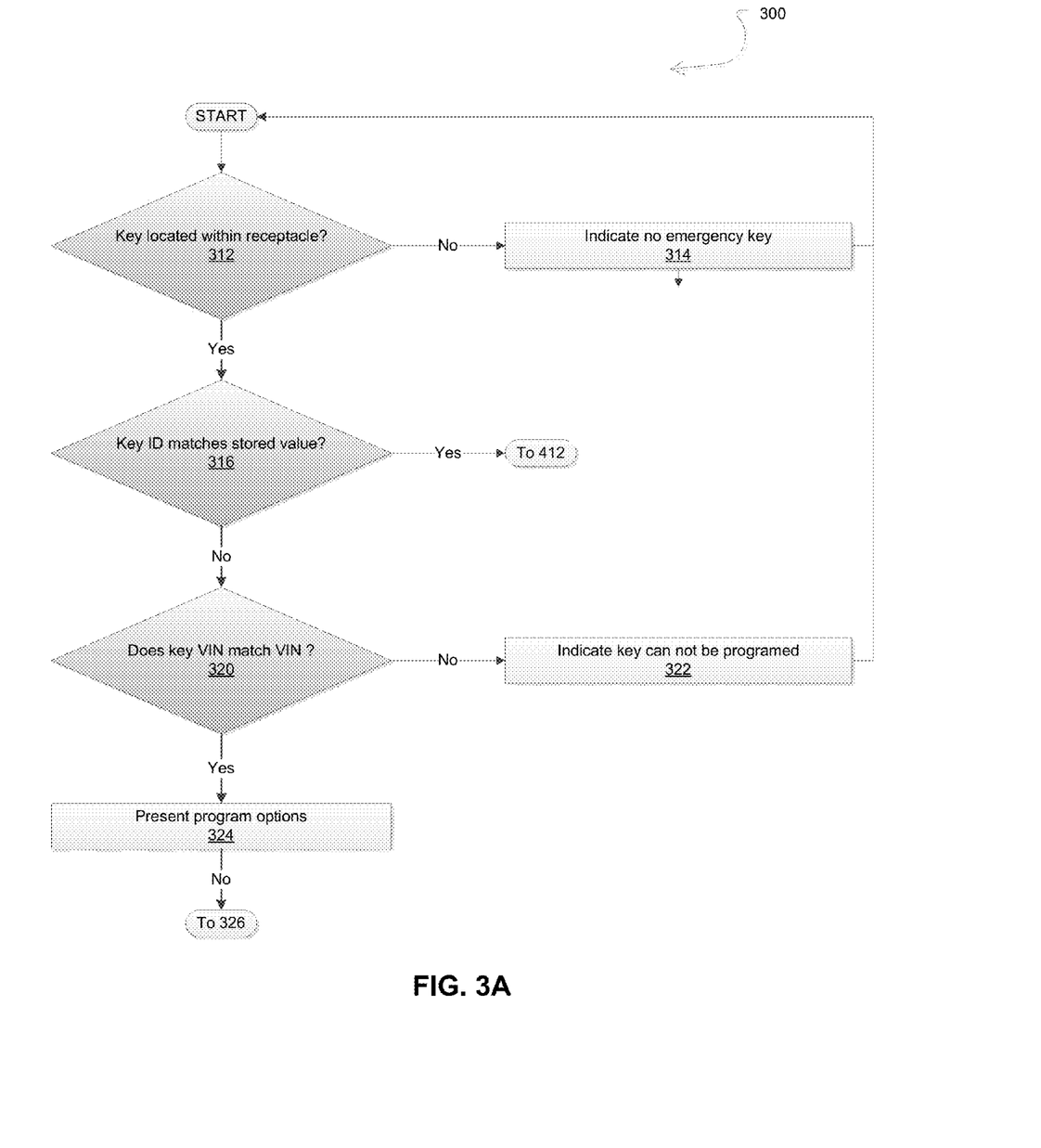
FIGS. 3A-C show an exemplary flow chart of the emergency transfer system.
Figure 3B:
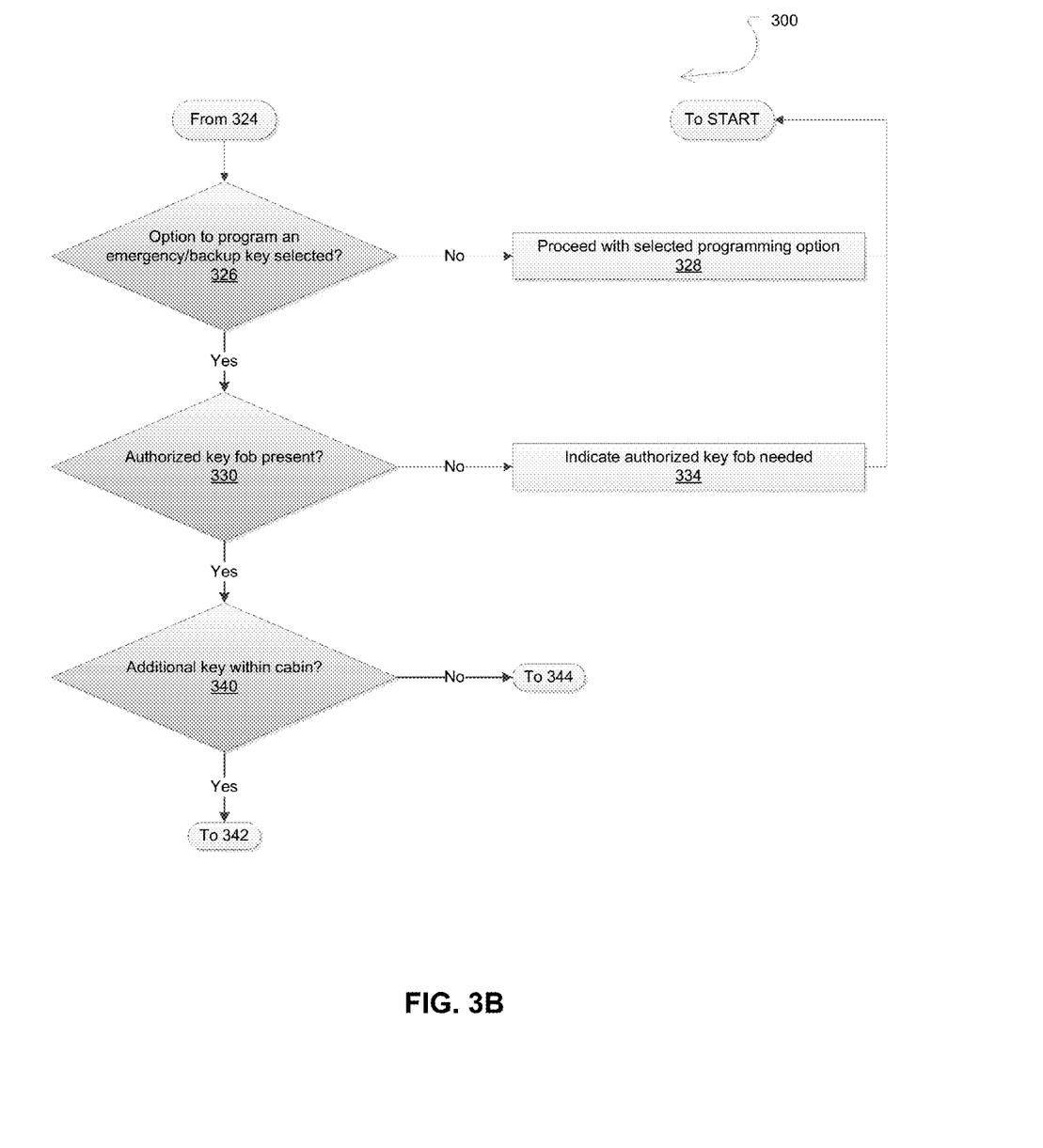
Figure 3C:
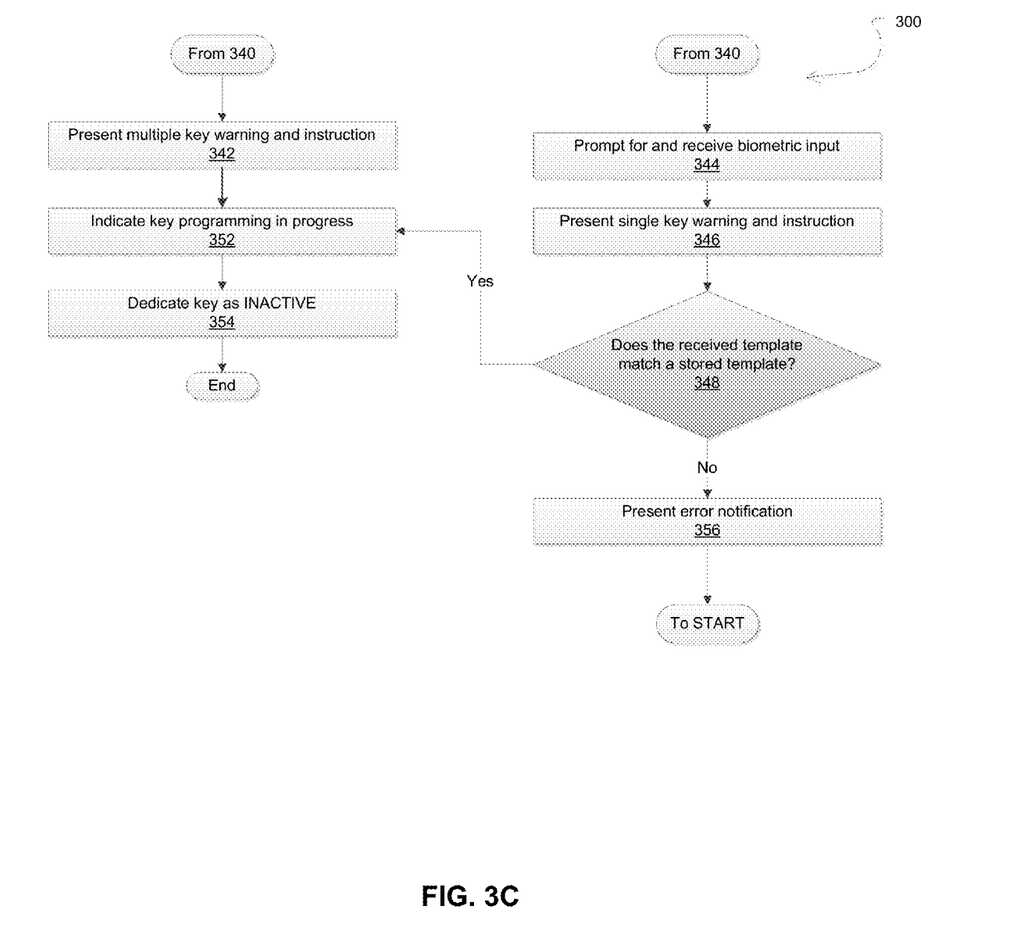
Figure 4A:
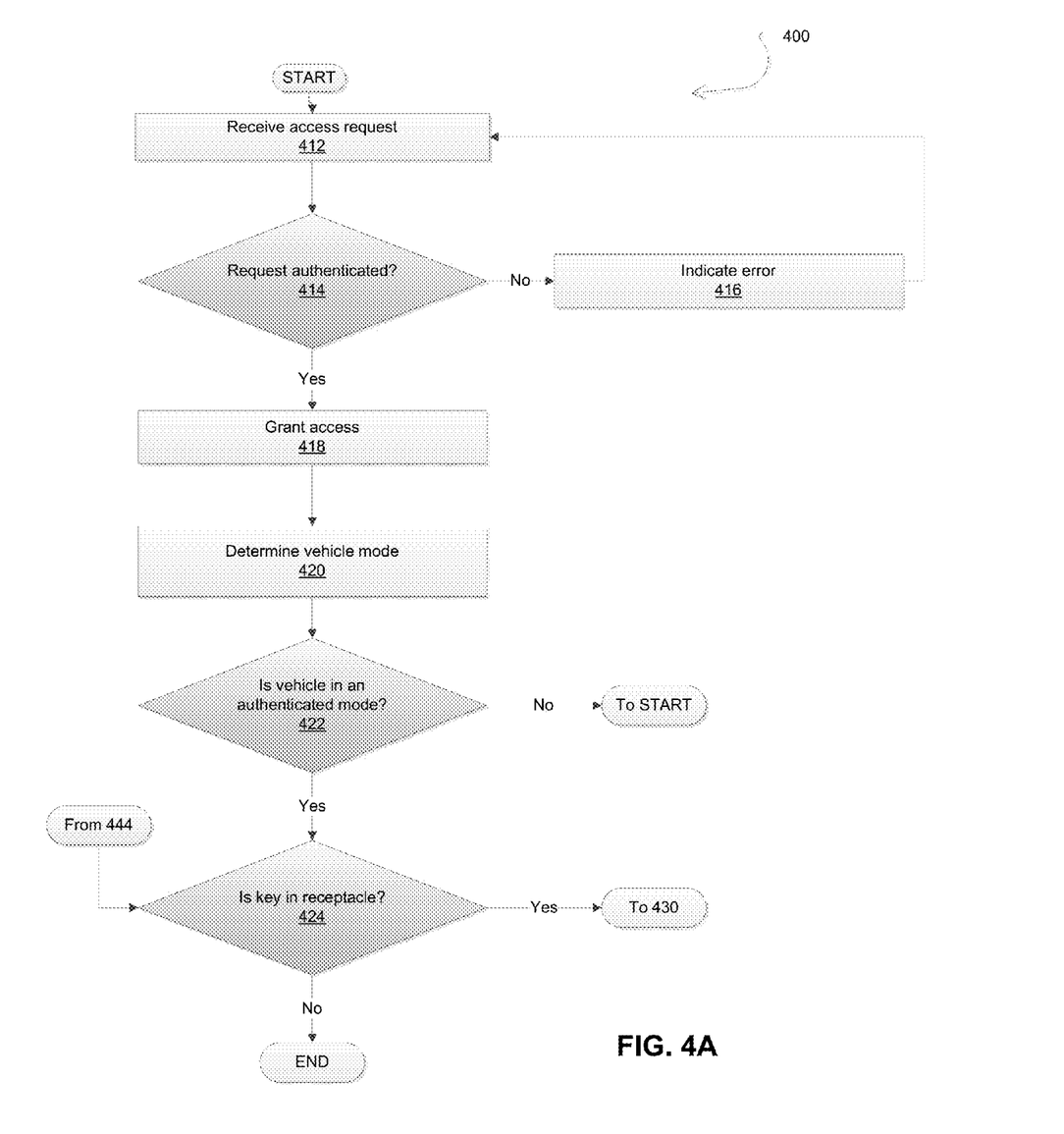
FIGS. 4A-B show another exemplary flow chart of the system.
Figure 4B:
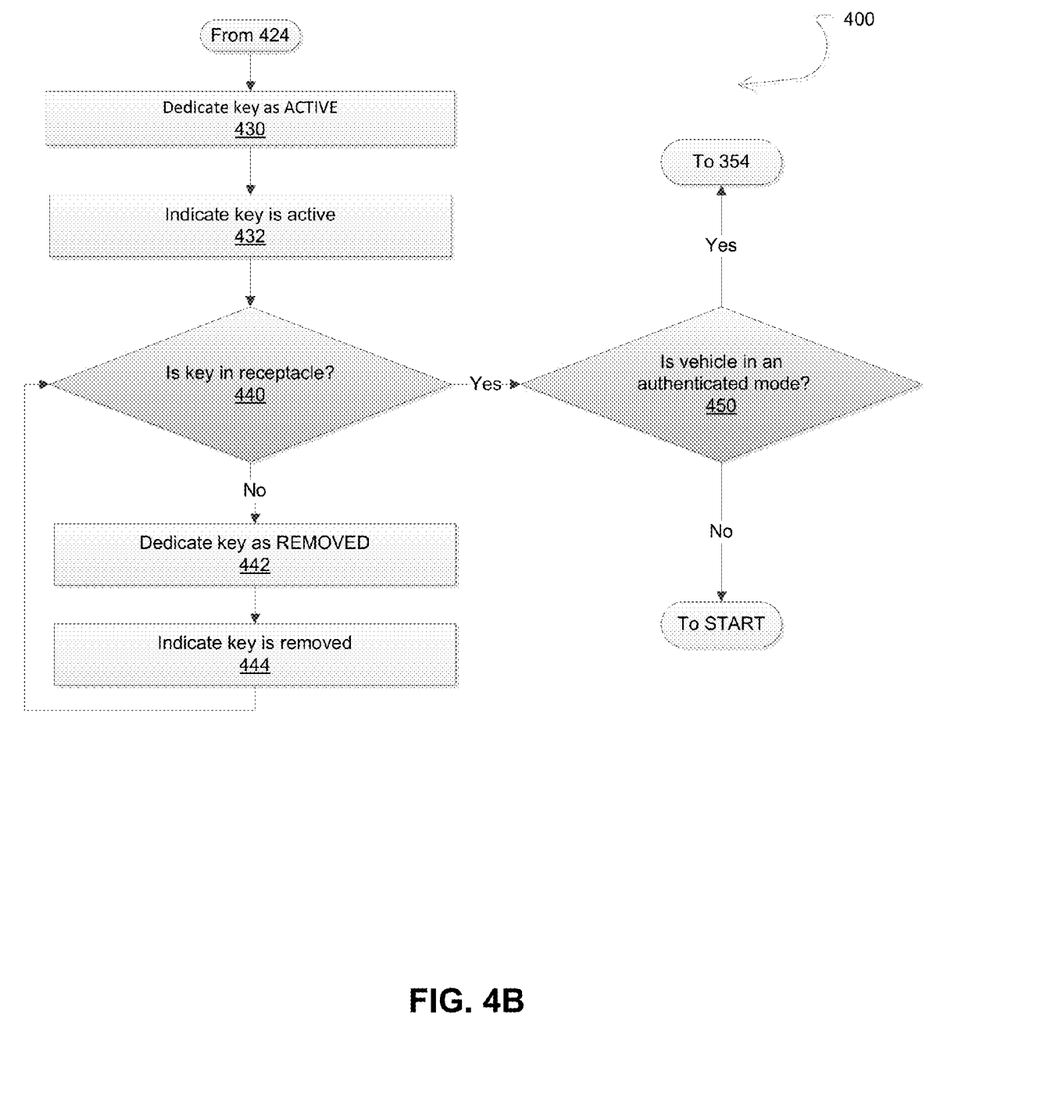

FIGS. 3 and 4 shows exemplary processes for implementing the key transfer system. Specifically, FIGS. 3A-C show an enrollment process while FIGS. 4A-B show an authentication processes. While FIGS. 3 and 4 are shown as separate processes, some cross-over between the processes may occur. Specific examples of this cross-over are described below.

Starting with FIG. 3A, at block 312, the system 100 may determine whether a key fob is located within the receptacle 106. As explained above, a key fob located within the receptacle 106 may be a back-up key fob or an emergency transfer key fob 126. The system 100 may determine whether a key fob is located within the receptacle 106 by sending a low frequency signal from the function controller 132. If a key fob is located within the receptacle 106, the key fob may respond to the low frequency signal by transmitting a response signal at a similarly low frequency. Due to the location of the receptacle with respect to the controller 132, the key fob 126 may only need to transmit signals at low frequencies, as opposed to higher frequencies when attempting to gain access to the vehicle or start the engine. Additional information may be transmitted to the function controller 132 and/or the system controller 102 during this response. For example, the ID of the key fob may be transferred. Other relevant information such as a vehicle identification number associated with the key fob, time stamp, etc., may also be transmitted. If the function controller 132 and/or system controller 102 receive a response from a key fob thus indicating that the key fob is located within the receptacle 106 (e.g. a low frequency response,) the process proceeds to block 316. If not, the process proceeds to block 314.

In block 314, it may be established, by a lack of a low frequency response from a key fob in response to a low power low frequency challenge, that a key fob is not located within the receptacle 106. Further, the vehicle function controller 132 may issue a high power low frequency challenge in search of a previously programmed emergency transfer fob. If no high frequency response is heard from the key, the vehicle may warn the user that the emergency transfer key is not in the receptacle 106 or the vehicle vicinity. The function controller 132 may then instruct the vehicle display 136 to indicate that no emergency transfer key fob 126 is located within the receptacle 106. For example, the display 136 may show a message reading "No Emergency Transfer Key Detected." This message may be displayed for a predefined number of cycles before it is suspended. For example, the message may be displayed five consecutive times. The process, upon showing the message, may return to START.

In block 316, the system 100 determines whether the key fob ID of the key fob 126 located within the back-up receptacle 106 matches that of the designated emergency transfer key ID within the database. The controller would address the fob 126 using the low power low frequency challenge and the key fob may respond with a low power low frequency message or transmit its response in the high frequency response to communicate its fob ID. The key fob ID may be compared with a list of valid IDs in the database. If there is no match between the received key fob ID and an ID within the database, or if the ID of the match is not associated with a designated emergency transfer key fob, the process proceeds to block 320.

If the key fob ID matches the ID of the designated emergency transfer key fob 126 in the database, the key fob 126 within the receptacle 106 may already be programmed or dedicated as an emergency transfer key fob 126 within the database. Thus, re-programming of the key fob 126 is not necessary at this time. In this example, the process may proceed to block 412 of FIG. 4A where upon the appropriate authentication, the emergency transfer key fob 126 may be designated as ACTIVE. In other words, upon a determination that the key fob 126 within the receptacle 106 has previously been designated as an emergency transfer key fob 126, the system may proceed with normal authentication processes within process 400. Further, because the key fob 126 is located within the receptacle 106, there is no need to proceed with the enrollment process because the key fob 126 is ready for use upon the appropriate authentication.

In block 320, upon determination that the key fob 126 within the receptacle 106 is not designated as an emergency transfer key fob for the subject vehicle system 100, the system then determines whether the key fob 126 within the receptacle 106 includes a VIN associated with the vehicle system 100. In other words, a key fob 126 has not yet been designated as an emergency transfer key fob 126 and now it must be determined whether the key has a VIN recorded in the fob memory and if the VIN indicated in the response signal matches that of the vehicle. If the VINs match, the process proceeds to block 324, if not, the process proceeds to block 322. If the fob has no VIN recorded, it can be programmed as either a normal key or designated as an emergency transfer fob.

In block 322, the vehicle display 136 may indicate that the key fob 126 cannot be programmed as an emergency transfer key fob. For example, a message may be displayed that states "Key in Receptacle cannot be assigned to this vehicle. Please see your Dealer." The process may then proceed to START. Upon proceeding to start, the user may insert a different key fob in the receptacle and the process 300 may initiate again with this key fob.

In block 324, the user may be presented with program options via the vehicle display 136. These options may include any combination of: 1. Program a new key as permanently ACTIVE, 2. Add new biometric template, 3. Start vehicle in back-up mode due to low key fob battery; and 4. Designate an emergency transfer key.

With respect to option 1, as described above, a new key fob 128-n may be designated as permanently ACTIVE upon appropriate authentication of at least one or more authorized key fobs or finger prints provided the person with the prints is presented for validation. For example, a third key fob may be programmed and given to a third user, e.g., a teenager by a parent. In order to activate this third key, the third key fob, as well as two additional previously programmed/paired keys may be present and recognized by the function controller 132, or two different people with their biometric inputs (e.g., prints) previously paired to the vehicle, or one previously paired key and one person with previously paired prints. The third key fob ID may be saved in the database and an active indicator may be associated therewith. Thus, access and drive rights to the vehicle may be granted upon the function controller's 132 recognition of the third key fob. With respect to the second option, a new biometric template may be added to the saved templates database 120 in order to authenticate a user. This process is similar to that described above in that two previously paired keys or biometric inputs, or one of each, must be stored in the vehicle system 100. With respect to the third option, upon realization that the key fob's battery is low, and therefore unable to transmit enough information at a desired distance to start the vehicle, the key fob may be placed in the back up receptacle 106. As explained, low power lower frequency signals may be transmitted to the controller 132 to start the vehicle. If the fourth option is selected, the process proceeds to block 326 of FIG. 3B.

In block 326, the system determines that the fourth option has been selected. If the fourth option has been selected, the process proceeds to block 330. If not, the process proceeds to block 328.

In block 328, the process carries out the selected option (options 1, 2 or 3) from block 324. The process then returns to START.

In block 330, the process proceeds to facilitate programming of an emergency transfer key fob 126 (option 4 from block 324). As explained, a user may select this option via the vehicle display 136. Additionally or alternatively this process may be initiated when a key fob is placed within the receptacle 106 while the vehicle is in a motive, accessory or delayed accessory mode. In this instance, the user may be prompted via the vehicle display 136 to program the spare key fob 126. Regardless, the controller 102, upon the initiation of the key fob programming, may first determine whether an authenticated key fob 128 is present (e.g. a daily user key fob 128-1). Similar to previous authentication, a function module may be woken up by receiving a signal from a key fob 128. The function controller 132 may transmit a low frequency signal to the key fob 128 and the key fob 128 may respond with a high frequency response. Upon realizing that the key fob 128 is an active and authorized key fob 128, e.g., the key fob ID is recognized by the function controller 132, the key fob 128 may be considered authenticated. If the key fob is authenticated, the process proceeds to block 340. If not, the process proceeds to block 334.

In block 340, the function controller 132 may determine whether an additional key (e.g., daily use key fob 128-2) is present within the vehicle. If so, the process proceeds to block 344 of FIG. 3C. If not the process proceeds to block 342 of FIG. 3C.

In block 342, a warning is presented that multiple keys have been detected. When multiple keys are detected, it may be important for a function controller 132 to differentiate between a key that is to be programmed as an emergency transfer key fob 126 and a key fob that is used to authenticate the user (e.g., grant access to the vehicle.) Thus, a warning may be issued to the user. An exemplary warning message may read "A second valid key has been detected in the cabin. Please ensure this key is in your possession and not in the possession of a person who may leave the vehicle. Once a key in the receptacle 106 is designated as an emergency transfer key, access to the vehicle with not be available unless 1) another paired key is present, or 2) biometric identification is authenticated." The process then proceeds to block 352.

In block 344, the user is prompted for a user input. Examples of user input may include a password, PIN, biometric input, RFID, etc. In one example, the biometric device 104 may scan the user's fingerprint. The process proceeds to block 346.

In block 346, a warning is presented via the vehicle display 136 that a single key fob is to be programmed as an emergency transfer key fob 126. Similar to the warning for a detection of multiple key fobs, an exemplary message may read "Once the key in the receptacle is designated as an emergency transfer key, access to the vehicle will not be available unless 1) another paired key is present, or 2) biometric identification is authenticated. Because no other keys have been detected in the cabin, it is recommended you use the biometric device to ensure you have authentication before designating the key fob within the receptacle as an emergency transfer key."

In block 348, the function controller 132 and/or the system controller 102 determine whether the received user input matches a stored input within the database 120. In the given example, the controller 102 may determine whether the received biometric template matches a stored template within the stored template database 120. Because only one authorized key fob is present, a second authentication (e.g., biometric authentication) may be required in order to program an emergency transfer key fob 126. Thus, the controller may compare the received biometric input/template with those stored in the template database 120. If a match is found, the process proceeds to block 352. If not, the process proceeds to block 356.

In block 352, a message via the vehicle display 136 may be presented indicating that the key is being programmed. For example, the display 136 may read "Emergency Transfer key programming in progress." The process proceeds to block 354.

In block 354, the key fob 126 in the receptacle 106 may be designated as an emergency transfer key fob 126. The default status of the emergency transfer key fob 126 is INACTIVE. Thus the key fob may not be used to gain access or drive rights to the vehicle unless it is re-designated as ACTIVE. By designating the key fob 126 as INACTIVE, the key fob may not be used to operate the vehicle. Thus, if the key fob 126 is extracted from the receptacle, the key fob may not be functional, preserving the security of the vehicle.

In block 356, an error notification may be presented via the vehicle display 136. An exemplary message may read "Emergency transfer programming aborted. Please locate valid paired key or another biometrically authenticated user." The process may then return to start.

Referring now to FIGS. 4A and 4B, an exemplary authentication process is described herein for programming an emergency transfer key fob 126 and updating its status within the database 138. The process begins at block 412. The system may receive an access request. The access request may include an authentication request to enter the vehicle. The access request may also include a request to start the vehicle. The request may be transmitted in any number of ways, such as those described herein. For example, a key fob 128 may send a request to the function controller 132. In another example, a user may present a biometric input via the biometric device 104, e.g., a fingerprint.

In block 414, the system 100 may determine whether the user is authenticated based on the user input accompanying the request. This may be done by comparing an inputted biometric template with the stored templates in the database 120. It may also be done by transmitting signals between a function controller 132 and the key fob 128, as described above. If the request is authenticated, the process proceeds to block 418. If not, the process proceeds to block 416.

In block 416, the request may be denied and a message may be displayed via the vehicle display 136 indicating that an error has occurred. For example, the message may read "invalid biometric input," "no key found," "key is inactive," or "not valid." Additional messages may also be presented to the user. For example, the display 136 may present a message reading "Please attempt revalidation of biometric input" or "Please press start button again." This message may repeat upon a failed authentication request until the request is authenticated or for a predefined number of cycles. For example, the error message may repeat for up to three requests. After a third failed attempt for access, the display 136 may present a final error message, such as "Invalid biometric input," or "No key found after multiple attempts." The message may further indicate "Please locate authenticated key or person with authenticated biometrics. If problems persist, please contact your service representative." The process may return to start.

In block 418, access to the vehicle may be granted based on an authenticated request.

In block 420, the controller may determine the mode of the vehicle at the time of the access request. For example and as discussed above, a vehicle may be in an authenticated mode or a non-authenticated mode. If the vehicle is in an authenticated mode, the process proceeds to block 422. If not the process may return to START.

In block 424, the controller 132 may determine whether an emergency transfer key fob 126 is in the receptacle 106. If so, the process proceeds to block 430 of FIG. 4B. If not, the process ends.

In block 430, the function controller 132 updates the status of the emergency transfer key fob 126 in the PEPS database to ACTIVE. Thus, if the key fob is extracted from the receptacle 106, the key fob may be a fully functional key fob capable of granting access and drive rights to the vehicle.

In block 432, the vehicle display 136 may present a message indicating that the emergency transfer key fob 126 is now active. An exemplary message may read "Emergency transfer key is now active."

In block 440, the controller determines whether a key is present in the receptacle 106. If a key is located within the receptacle 106, the process proceeds to block 450. If not, the process proceeds to block 442.

In block 442, the PEPS database is updated to indicate that the key has been removed. For example, the status of the key may change to REMOVED within the database.

In block 444, the vehicle display 136 may indicate that the key fob has been removed. An exemplary message may read "Active emergency transfer key has been removed from the receptacle and is now fully active." The process may proceed to block 424. In this example, the vehicle may detect when the key is returned to the receptacle 106.

In block 450, the system controller 102 and/or the function controller 132 may determine whether the vehicle is in an authenticated mode. If it is, the process proceeds to block 440. If not, the process proceeds to block 354, where the key fob 126 is set to be INACTIVE. Thus, if a vehicle is not in the appropriate mode, the emergency transfer key fob 126 will not be set to ACTIVE. It should be noted, that once a key fob 126 is designated as ACTIVE, it may remain in this state so long as it is not removed from the back-up receptacle 106 in a non-RUN mode. Moreover, once an emergency transfer key fob 126 has been removed, it may return to an INACTIVE state once it is replaced in the retention wall 142.

It may be noted that an emergency transfer key 126 may not be used or set as a primary daily use key. In order to use a spare key fob as a primary key, the VIN must match that of the VIN associated with the key fob. This is to deter theft, and prevent unauthorized users from re-programming key fobs. Further, in the event that the emergency transfer key fob 126 is removed from the receptacle 106 while it is designated as IN-ACTIVE, the vehicle may be configured to transmit a warning or message to a designated communication address, (e.g., a phone number, email address, etc.) In one embodiment, the telematics or other form of sync technology may be used to communicate with an external device (e.g., cell phone, personal computer, tablet, etc.)

Accordingly, a system described herein provides a simplified solution for programming back-up keys and an authentication system configured to ensure security of the vehicle is maintained.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

In general, computing systems and/or devices such as such as the controllers, biometric devices, displays telematics functions, etc., may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices, such as the controllers, biometric devices, displays telematics functions, etc., may generally include computer-executable instructions that may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory or a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions on one or more computing devices, stored on computer readable media associated therewith. A computer program product may comprise such instructions stored on computer readable media for carrying out the functions described herein. In some examples, the application software products may be provided as software that when executed by processors of the devices and servers provides the operations described herein. Alternatively, the application software product may be provided as hardware or firmware, or combinations of software, hardware and/or firmware.

What is claimed as new and desired to be protected by Letters Patent of the United States is:

1. A system comprising:
   a system controller in communication with a function controller, the system controller configured to:
   receive an authentication request, including a user input;
   authenticating the user input by matching the user input with at least one stored input;
   determining a vehicle mode;
   updating, via the function controller, a status associated with a key fob in response to the vehicle mode being in an authenticated mode.

2. The system of claim 1, wherein the updated status associated with the key fob indicates the key fob is functional.

3. The system of claim 1, wherein the key fob is arranged in a receptacle within a vehicle.

4. The system of claim 1, wherein the function controller is configured to determine that the key fob is not arranged within the receptacle.

5. The system of claim 1, wherein the function controller is configured to associate a removed status with the key fob upon removal of the key fob from the receptacle.

6. The system of claim 1, further comprising a biometric device in communication with the system controller, wherein the user input is a biometric input received from the biometric device.

7. The system of claim 1, further comprising a database in communicated with the function controller and configured to maintain the status associated with the key fob.

8. The system of claim 1, wherein the authenticated mode includes at least one of a motive, accessory, and delayed accessory mode.

9. A method, comprising:
   receiving, at a computing device, an access request including a user input;
   comparing the user input with at least one stored input;
   authenticating the user in response to the user input matching the at least one stored input;
   determining a vehicle mode;
   updating a status associated with a key fob in response to the vehicle mode being in an authenticated mode.

10. The method of claim 9, further comprising determining that key fob is arranged in a receptacle within a vehicle.

11. The method of claim 9, wherein the function controller is configured to associate a removed status with the key fob upon removal of the key fob from the receptacle.

12. The method of claim 9, wherein the user input is a biometric input.

13. The method of claim 9, further comprising maintaining the status associated with the key fob in a database.

14. The method of claim 9, wherein the authenticated mode includes at least one of a motive, accessory, and delayed accessory mode.

15. A method comprising:
    detecting a key fob within a receptacle;
    authenticating a first input;
    authenticating a second input;
    updating, at a computing device, the status associated with the key fob to include a backup status in response to the authentication of the first and second inputs.

16. The method of claim 15, wherein the first input is a frequency signal including a first input identification and wherein the second input is a frequency signal including a second input identification.

17. The method of claim 15, wherein the first input is a frequency signal including a first input identification and wherein the second input is a biometric input.

18. The method of claim 15, further comprising updating the status associated with the key fob to include an inactive status.

19. The method of claim 15, wherein the detecting the key fob includes receiving a signal from the key fob at a function controller.

20. The method of claim 16, wherein the signal includes a key fob identification and a vehicle identification number.

* * * * *